May 1, 1956 J. H. DAWSON ET AL 2,743,562
TAPING MACHINE
Filed Dec. 12, 1950 6 Sheets-Sheet 1
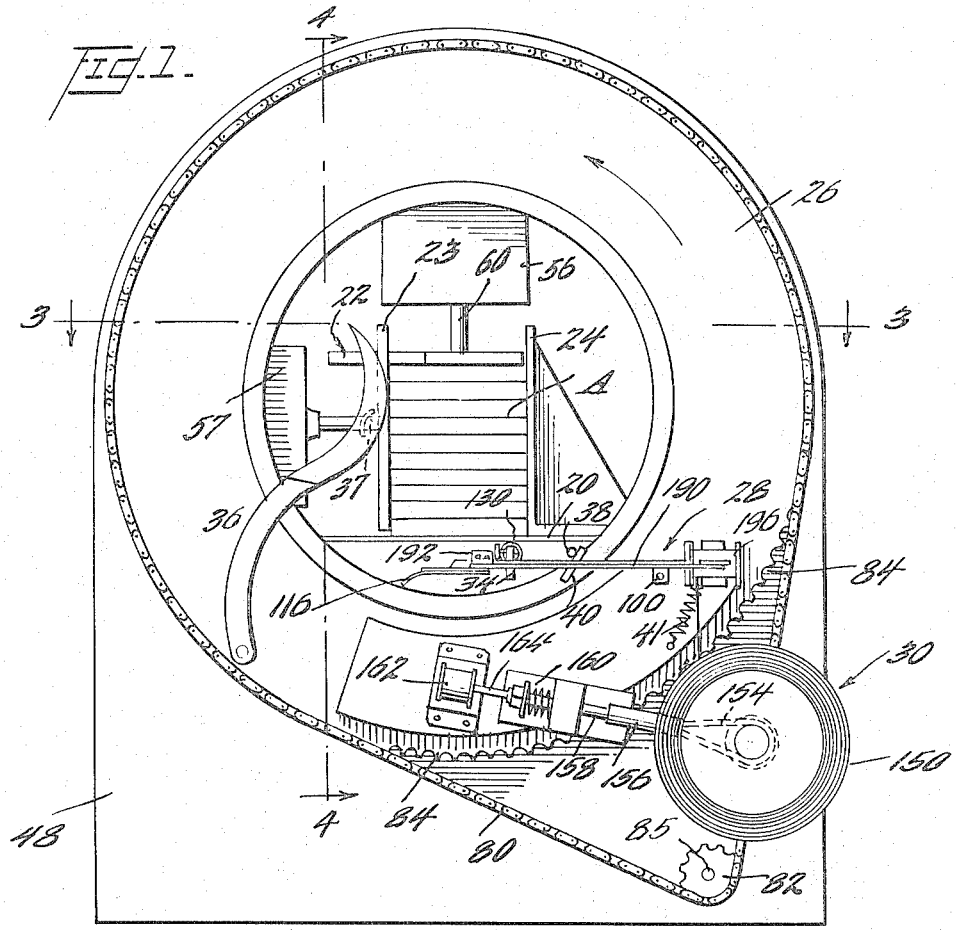
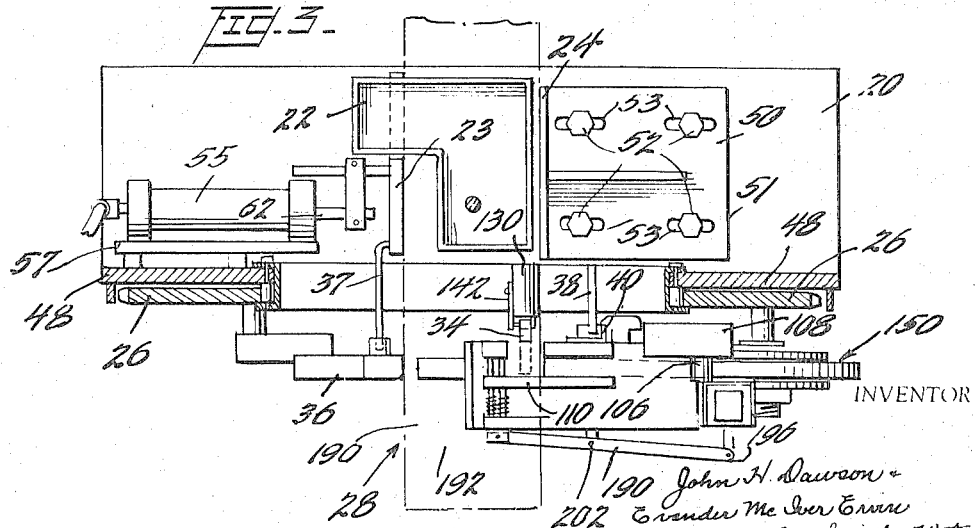
INVENTOR
John H. Dawson &
Evander McIver Ervin
By Watson, Cole, Grindle & Watson
ATTORNEY

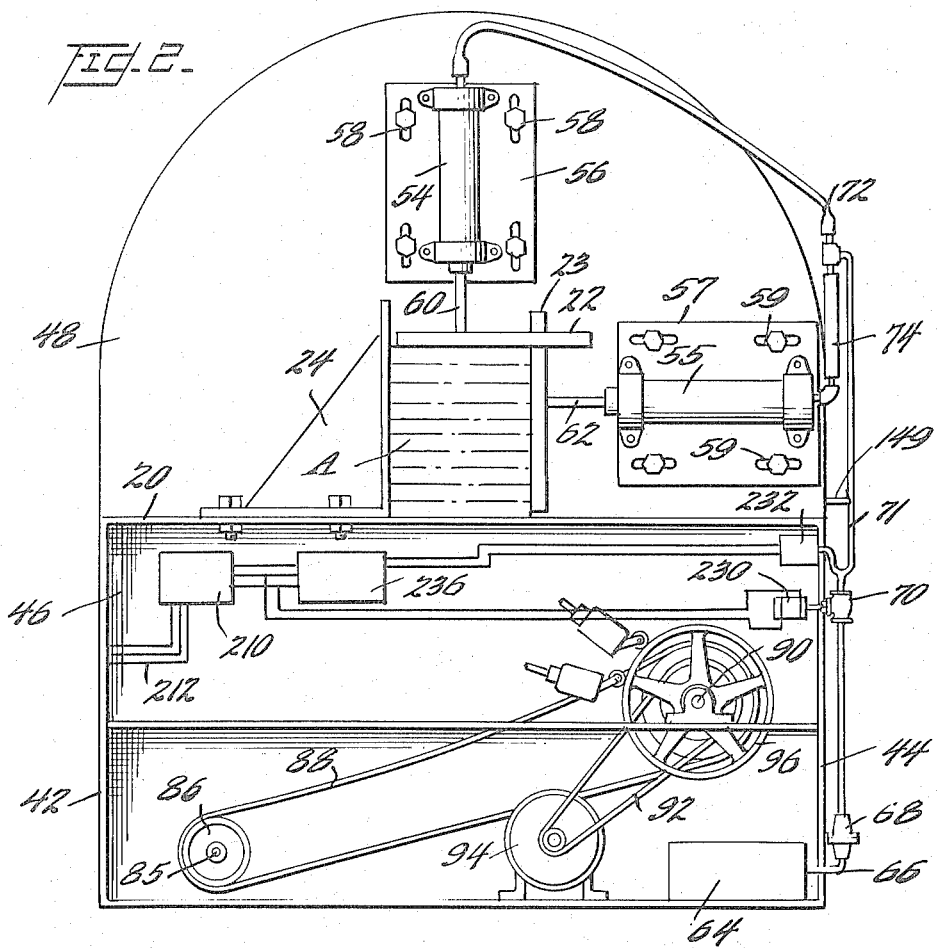
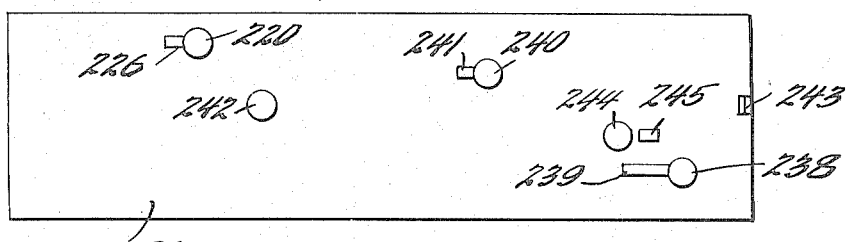

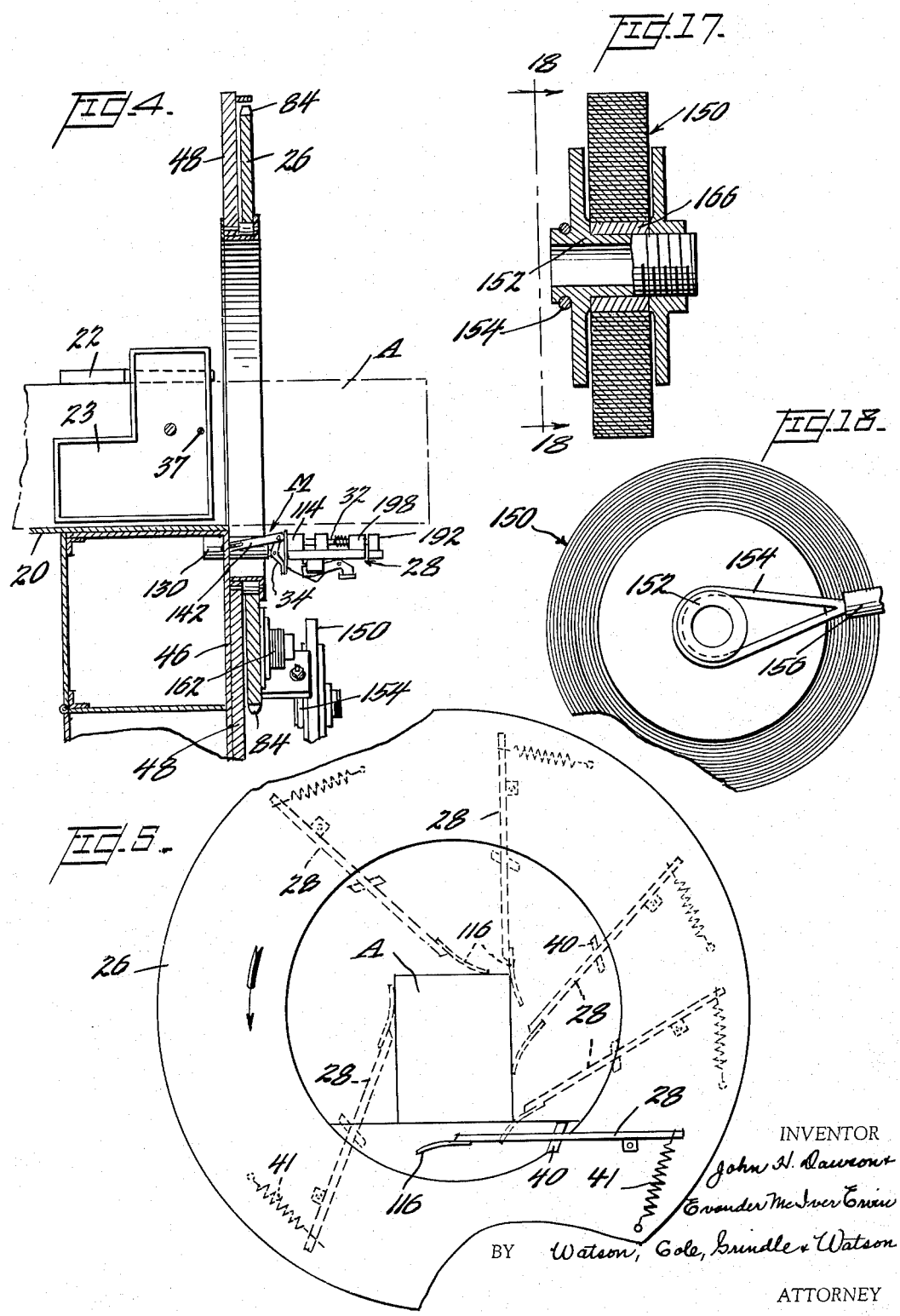

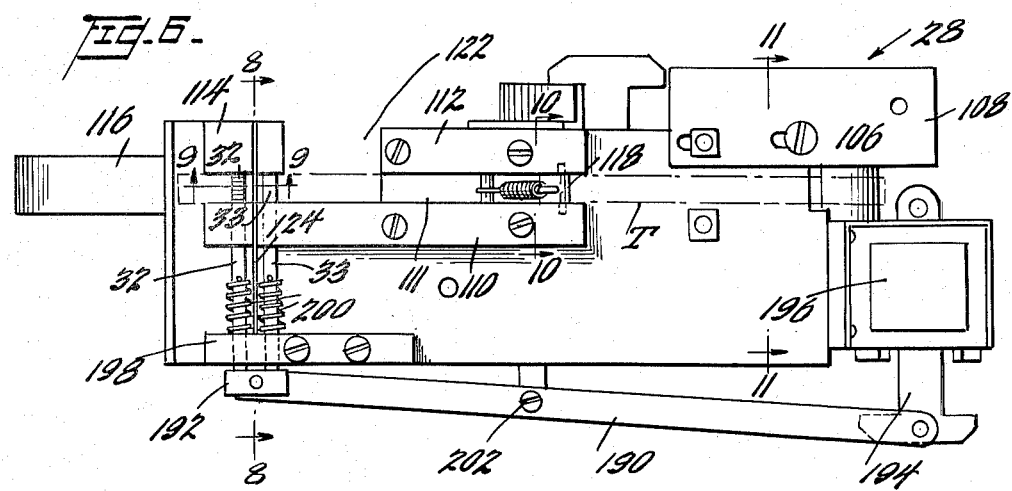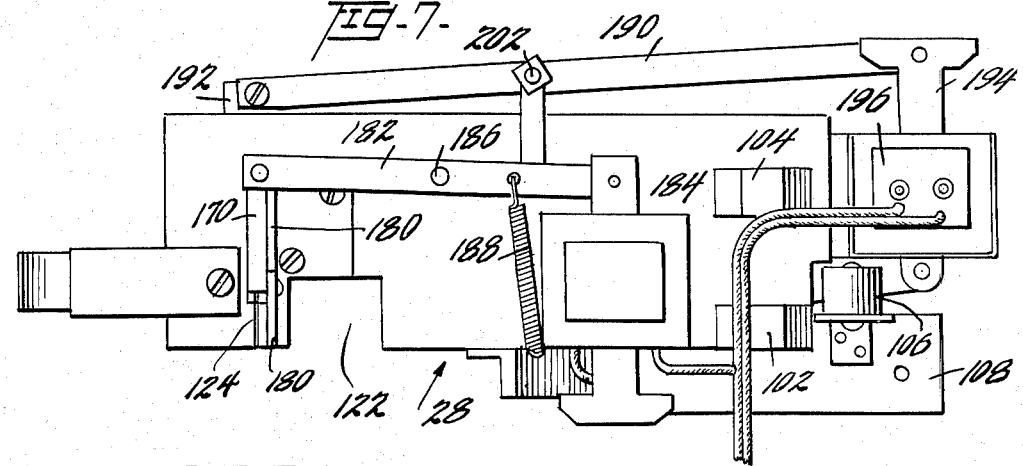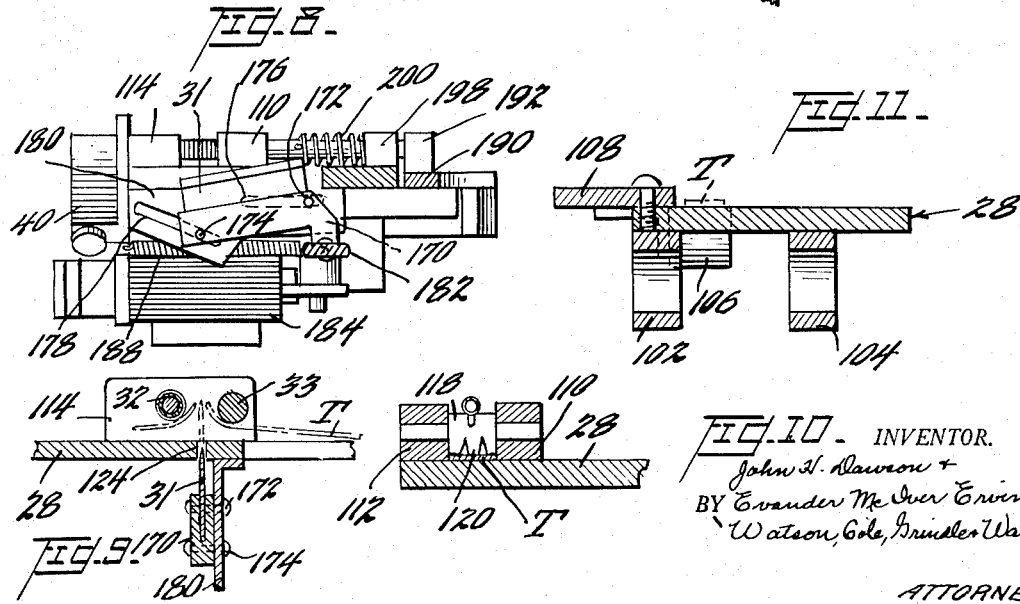

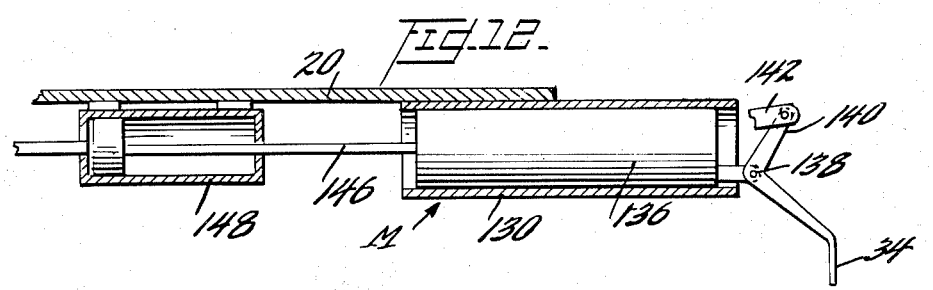
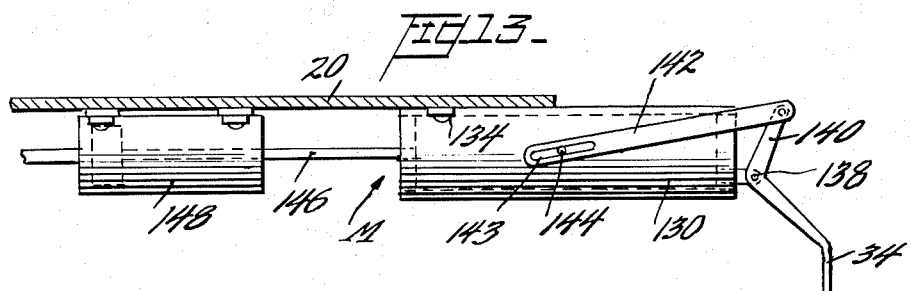
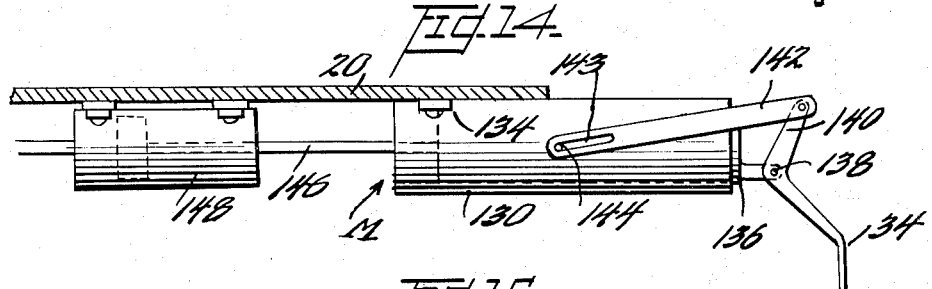
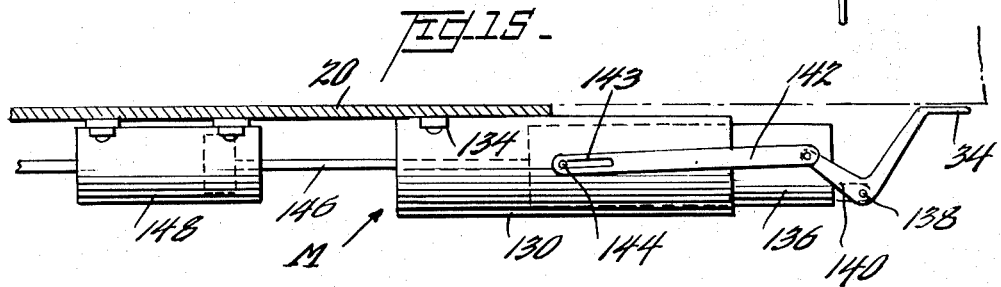
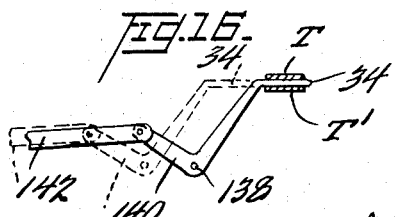

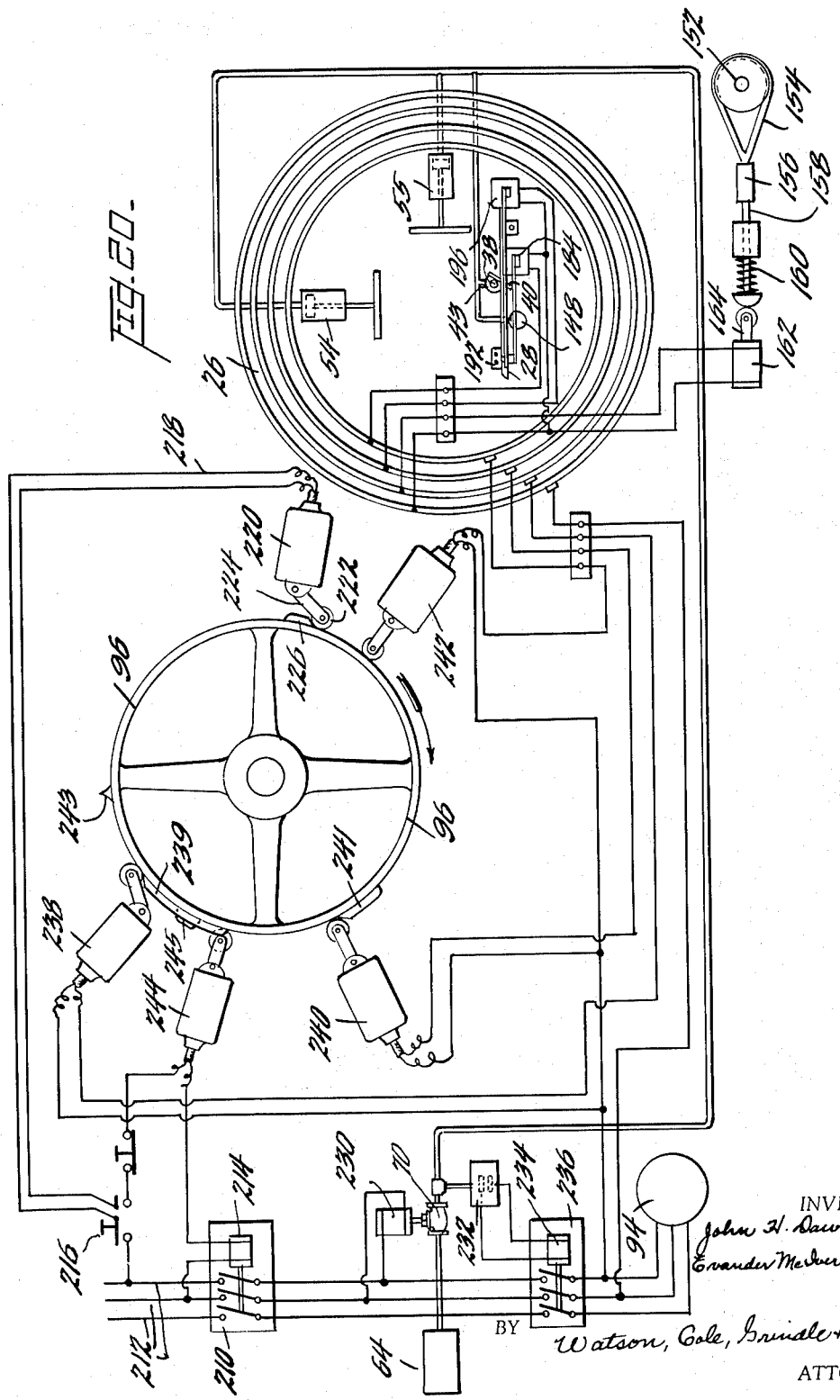

United States Patent Office 2,743,562
Patented May 1, 1956

2,743,562
TAPING MACHINE

John H. Dawson, Sumter, and Evander McIver Ervin, Florence, S. C.

Application December 12, 1950, Serial No. 200,426

13 Claims. (Cl. 53—77)

This invention relates to automatic wrapping machines of the type which act to apply adhesive tape bindings to articles such as cartons or boxes to strengthen and seal them, or to a number of separate articles to form them into a bundle. A machine of this kind is described and claimed in U. S. Patent application, S. N. 163,559, filed May 22, 1950, now Patent No. 2,696,778.

It may be seen by reference to the aforesaid application that a typical wrapping machine of the kind to which this invention relates comprises a support for an article to be wrapped, and a wrapping mechanism which acts first to secure the free end of a supply of adhesive tape to the article. Thereafter, the wrapping mechanism acts to withdraw tape from the supply thereof, and to apply it to the article as the tape supply is carried around the article. In order to make the adhesive tape binder thus applied to an article as secure as possible, the wrapping operation is continued ordinarily until an overlap of the tape has been formed. The tape is then severed, and the newly formed free end of the tape supply is fixed in a position where it may be automatically attached to an article to be wrapped by a succeeding wrapping operation.

In this kind of a wrapping machine it is convenient and desirable to guide the tape being applied to the article by passing it over a supporting surface, which, in addition to serving to guide the tape onto the article, disposes the tape conveniently for severing, and for subsequent attachment to an article to be wrapped.

The guiding action of such a tape support, and the tenacity with which the tape adheres to an article to which it is applied, are improved by maintaining the portion of the support from which the tape passes onto the article in proximity to the article as the tape supply and the tape-guide are carried around the article in the course of the wrapping operation. It is necessary, however, at the conclusion of the wrapping operation to prevent the tape-guide from obstructing the removal of the wrapped article and the subsequent insertion into the machine of another article to be wrapped. Previously, such obstruction has been avoided by constructing and supporting the tape guide so that it is maintained at a suitable distance from the article being wrapped as it approaches its rest position. This results, necessarily, in diminishing the strength of the adhesive bond between the article being wrapped and the tape applied thereto during this portion of the wrapping operation.

A purpose of this invention is to provide an improved tape applying means which includes a tape guide which acts to lay the adhesive tape binding on the article in a manner which improves the adhesion of the tape to the article. The invention also provides means for preventing the tape applying means from interfering with the handling of the articles being placed in or being removed from the machine, without in any way reducing the fastness of the adhesive bond between the tape and the article being wrapped.

Applying an adhesive tape binding to an article in an automatic wrapping machine involves a number of special problems which arise from the necessity of exposing the adhesive surface of the tape to the various devices which act upon the tape during the course of the wrapping operation. The foremost of these problems involves securing the tape to the article to be wrapped at the beginning of the wrapping operation, severing the tape at the completion of the wrapping, and retaining the free end of the severed tape in a position where it may be acted upon conveniently by the device provided for securing it to an article to be wrapped by a succeeding wrapping operation. The present invention provides greatly simplified and efficient means for securing, severing and retaining the free end of the tape, as described, during the wrapping operation. As it will later appear, the improved operation and the simplification of the aforesaid means is attributable, in a large degree, to the arrangement wherein the action of the tape severing device is coordinated with that of the tape retaining means, and in turn, the action of the retaining means is coordinated with that of the device for securing the tape to an article to be wrapped.

Other objects and advantages of the invention will appear from the detailed description of the embodiment of the invention which is shown in the drawings.

In the drawings:

Figure 1 is a front elevational view of a wrapping machine embodying the present invention;

Figure 2 is a rear elevational view of the same machine;

Figure 3 is a horizontal section on lines 3—3 of Figure 1;

Figure 4 is a vertical section on line 4—4 of Figure 1;

Figure 5 is a schematic elevational view of the tape-guiding arm and its rotatable support showing in dotted line a number of successive positions assumed by the tape-guiding arm during a wrapping operation;

Figure 6 is a top plan view of the tape-guiding arm;

Figure 7 is a bottom plan view of the same tape-guiding arm;

Figure 8 is a vertical sectional view on line 8—8 of Figure 6;

Figure 9 is a vertical sectional view on line 9—9 of Figure 6;

Figure 10 is a vertical sectional view on line 10—10 of Figure 6;

Figure 11 is a vertical sectional view on line 11—11 of Figure 6;

Figure 12 is a vertical longitudinal view through the tacking mechanism;

Figure 13 is a side elevational view of the tacking mechanism;

Figures 14 and 15 are views similar to Figure 13 showing two successive positions assumed by the operating parts of the tacking mechanism during the operation thereof;

Figure 16 is a side elevational view of the tacking blade of the tacking mechanism, showing in dotted line a position assumed by the blade as it is withdrawn from an overlap of tape;

Figure 17 is a diametric section through the tape supply and in support therefor;

Figure 18 is a view on line 18—18 of Figure 17;

Figure 19 is a planer development of the surface of the control drum shown in Figure 20 which illustrates the relative positions of the cams carried on the surface of the control system cam drum, and the switches operatively associated with the respective cams; and Figure 20 is a diagram of the control system for the wrapping machine.

As shown in Figure 1, a machine embodying the instant invention may comprise a frame member which is provided with a platform 20 for supporting an article A to be wrapped by the machine. At the start of the wrapping operation the article to be wrapped is clamped firmly in position on the article support by clamping plates 22, 23, one of which presses the article against the support, and the other of which presses the article laterally against a stationary guide plate 24. An article thus clamped in the machine is then acted upon by a wrapping mechanism which includes means for bringing the adhesive coated surface of the free end of a length of tape into contact with the article carried on the support and for thereafter encircling the article with the tape. The wrapping mechanism includes a rotatable annular member 26 on which is supported a tape-guiding arm 28. A tape supply 30 is also supported on the annular member 26, and the free end of the tape supply passes over and is supported upon the tape-guide 28. It may be seen from Figure 4 that the article to be wrapped is initially positioned in the machine so that a portion of the article extends through the central aperture of the annular member 26 to a point above the tape-guiding arm 28.

At the beginning of the wrapping operation the free end of the tape is adhesively attached to the article by a tacking mechanism M, the construction and operation of which is depicted in Figures 12–15. The tacking mechanism includes a blade member 34 which is swung upwardly to strike the tape against the article, and to hold the tape against the article throughout the wrapping operation. The annular member 26 is thereupon rotated. The tape-guide is thus carried through the successive positions illustrated in Figure 5, thereby encircling the article with adhesive tape. In order to secure a firm binding or bundling of the article, the wrapping operation is continued until an overlap of the tape is formed. The tape is then severed. The rotation of the wrapping mechanism is continued until the tape guide has reached its initial or rest position which is that shown in Figures 4 and 5. The article-holding clamps 22, 23 are then retracted to release the wrapped article, and the tacking mechanism blade 34 is withdrawn from between the overlap of the tape to complete the wrapping operation.

The tape severing device, which is illustrated in detail in Figures 8 and 9, is supported on the tape-guide 28, and includes a cutting blade 31 which at an appropriate time is moved against the tape to sever it. The tape is prevented from retreating before the advancing cutting blade by a tape-positioning and retaining means comprising the pairs of plungers 32, 33 which normally overlie the tape, as seen most clearly in Figure 6. The plungers are arranged to cooperate with the tape-severing means so that the free end of the severed tape is retained in position on the tape-guide wherein it may be acted on by the tacking mechanism at the beginning of the succeeding wrapping operation. This is accomplished by the severing action of the cutting blade which wipes the newly formed free end of the tape supply onto one of the plungers 32, 33, to which it adheres until detached by the subsequent action of the tacking mechanism.

The tape-retaining mechanism is also arranged to cooperate with the tacking mechanism so that the free end of the tape supply is released from the plunger by the tacking mechanism. The plungers are then free to be withdrawn from the position in which they normally overlie the tape. Subsequently in the wrapping operation, the plungers are again returned to the position in which they overlie the tape in readiness for a subsequent operation of the tape-severing means.

The end of the tape-guiding arm 28 from which the tape passes onto the article is resiliently pressed against the article during the wrapping operation. The end of the arm trailing over the tape as it is applied to the article, as shown in Figure 5, wipes the tape firmly onto the article. A further wiping action is performed by the wiping arm 36 which is supported on the annular member 26 in a following direction from the tape-guiding arm. The wiping arm is similarly resiliently pressed toward the article during the wrapping operation. Both the tape-guiding arm 28 and the wiping arm 36 are withdrawn from contact with the wrapped article at the completion of the wrapping operation so that the wrapped article may be removed freely from the machine and another inserted. The wiping arm 36 is retracted by the finger 37 which is fixed to the article clamp 23 in position to engage the lug 39 on the wiping arm when the clamp is moved to release the article. The tape-guiding arm, upon reaching its rest position, is retracted and held away from the article by the action of a retractable bolt 38 upon a camming plate 40 fixed to the tape-guide, as illustrated in Figures 1 and 3. The bolt 38 may be the piston rod of a cylinder-piston arrangement 43, and is withdrawn from engagement with the cam plate 40 immediately upon the commencement of a wrapping operation. The tape-guiding arm is thus released so that the end from which the tape passes onto the article may be pressed against the article by the action of the spring 41. The bolt is spring-urged into the position in which it engages the plate 40, and the control mechanism of the machine acts to admit air to the cylinder 43 to overcome the spring action and hold the bolt in inoperative position throughout the wrapping operation.

It will be apparent from the foregoing general description that the several devices which act on the tape during the course of the wrapping operation must be operated in a timed relationship. Such operation is obtained by the control system which is illustrated schematically in Figures 19 and 20. A full description of the control system will be made as part of the following detailed description of the embodiment of the invention which is illustrated in the accompanying drawings.

Referring to Figures 1, 2 and 4, it will be seen that the frame of the wrapping machine comprises a machinery cabinet having sides 42, 44, 46. The top of the cabinet is formed by the article support 20, previously referred to. A vertically disposed plate 48 is secured to the forward wall 46 of the machinery cabinet. A circular aperture is provided in the plate 48 an located so that an article of the size it is desired to wrap may be placed on the article support 20 to extend through the aperture. An abutment plate 24 is supported on the article support 20 to cooperate with the clamp 23 to firmly hold the article during a wrapping operation. As may be seen in Figure 3, the abutment plate comprises horizontal flanges 50, 51 which engage the support 20, and are secured to the support by bolts 52. The bolts extend through slotted apertures 53 in the flanges so that the abutment plate 24 may be shifted laterally to any desired position on the article support, as may be necessary in accommodating articles of different sizes in the wrapping machine.

The clamps 22, 23 are advanced and retracted by the cylinder-piston arrangements 54, 55, respectively. The cylinders thereof are fixed to plates 56, 57 which are adjustably supported on the frame member 48 by means of bolts 58, 59 which extend through elongated slots in the plates. The clamps 22, 23 are fixed to the piston rods 60, 62 respectively, and are caused to move in object positioning direction by admitting compressed air to the cylinders 54, 55 behind the pistons (not shown) therein. A source of compressed air is contained in the reservoir 64 and passes through the conduit 66, the regulator valve 68, the solenoid controlled air valve 70, and the branch lines 72, 74 to the cylinders 54 and 55, respectively. The admission of air to the cylinders is controlled by the valve 70 which is connected into the control system for the machine in a manner which causes the positioning mechanism to be operated at the beginning of the machine operation immediately prior to the operation of the wrapping mechanism. The manner in which this desired sequential operation of the clamping mechanism and the wrapping mechanism is obtained will be described more fully hereinafter in connection with the control system for the machine.

The annular member 26 is rotatably supported on the vertical plate 48 of the frame of the machine. The member 26 is provided with a central aperture which is co-extensive with the aperture which is formed in the plate 48, and the annular member is supported on the plate so that the apertures therein coincide. As previously explained, the tape-guiding arm 28 is supported on the annular member 26, and is carried through the successive positions shown in Figure 5 as the annular member is rotated in the direction indicated by the arrow in Figures 1 and 5 during the course of a wrapping operation.

By referring to Figures 1 and 2 it will be seen that the rotation of the member 26 is obtained by the chain drive 80 from the sprocket 82 to the peripheral teeth 84 on the annular member. The sprocket 82 is fixed to the shaft 85, which shaft is journaled in the front frame members of the machine and has fixed to its rearward end the sprocket wheel 86 (Figure 2). The chain drive 88 for the sprocket wheel 86 is taken from the shaft 90 which in turn is driven by the chain drive 92 directly from the main driving motor 94. The cam drum 96 of the control system is also fixed to the shaft 90, and the chain drives 92, 88, 80 are related so that the annular member 26 is carried through two full revolutions to each one made by the cam drum. The drives are arranged in this way so that the annular member may progress beyond one revolution to form an overlap of the tape, which increases the strength of the binding, and by further rotation return to its initial or starting position conditioned for the start of another wrapping operation.

The construction of the tape-guiding arm may be seen most clearly in Figures 6, 7 and 11. The tape-guiding arm 28 is pivotally supported on the annular member 26 by means of a bolt or stud 100 which is received in journals formed in the lugs 102, 104 fixed to the bottom side of the tape-guiding arm. The adhesive tape to be applied to an article by a wrapping operation is passed from the tape supply 30 over the freely supported roller 106 which turns on a shaft fixed to the plate 108 which is adjustably supported on the body of the tape-guiding arm. As shown in Figure 6, the tape is disposed along the length of the arm and normally passes through the guideway 111 formed between the spaced parallel bars 110, 112, 114 fixed to the upper surface of the tape-guiding arm. From the guideway 111 the tape passes onto the spring extension 116 which serves to wipe the tape onto the article in the manner illustrated in Figure 5 as the tape-guiding arm is carried around the article being wrapped. The tape disposed in the guideway 111 passes beneath a retaining dog 118, seen best in Figure 10, which permits the tape to pass beneath it freely as the tape is being dispensed, and which is spring-pressed in the direction which will cause its serrated edge 120 to grip the tape and prevent it from retreating when the tape is severed while under tension. The tape in the guideway also passes beneath the plungers 32, 33 of the tape-retaining device which positions the tape to be acted upon effectively by the severing mechanism.

The tape-guiding arm is recessed as at 122 as shown in Figures 6 and 7, to expose the under side of the tape so that it may be acted upon by the tacking mechanism which strikes the tape against the article to be wrapped at the beginning of the wrapping operation. The tacking mechanism M is located on the under side of the article support 20 in position to permit the tacking blade 34 to swing upwardly through the recess 122 against the under side of the tape when the tape-guiding arm is in its initial or rest position, which is that illustrated in Figures 3 and 4.

A transverse slot 124 is provided in the tape-guiding arm between, and parallel to, the plungers 32, 33, and the severing mechanism, illustrated in Figure 8, is arranged on the under side of the tape-guiding arm so that the cutting blade 31 thereof moves upwardly through the slot 124 to its tape-severing position.

At the beginning of a wrapping operation the tape-guiding arm will be positioned relative to the tacking mechanism as illustrated in Figure 3, and the end of a length of tape coming from the tape supply will be disposed across the recess 122, as illustrated in Figure 6. At the beginning of the wrapping operation the tacking mechanism is operated simultaneously with the article clamps previously described. This tacking mechanism consists of a sleeve 130 which is fixed beneath the platform 20 by means of brackets 134, as shown in Figure 13. A plunger 136 is slidably supported within the sleeve, and at its forward end there is pivoted at 138 a crank arm 140. The one end of the crank arm is tapered to a reduced thickness to form the tacker blade 34. The other end of the arm 140 is pivotally connected to one end of a link 142. The other end of this link is slotted, as at 143, to receive a radially extending pin 144 which is fixed to the outer surface of the sleeve 130. The rear portion of the plunger 136 is fixed to the piston rod 146 of the cylinder-piston arrangement 148. The tacking mechanism is actuated by the admission of air into the cylinder 148 by the operation of the solenoid air valve 70, previously described in connection with the operation of the article clamping means. Admission of air to the cylinder 148 causes the plunger 136 to move to the right as viewed in Figure 12. This movement continues, the blade 34 remaining in the lowered position shown in Figures 12 and 13, until the rear edge of the slot 143 engages the pin 144 fixed to the sleeve 130. This position of the mechanism is shown in Figure 14. The plunger 126 continues to move forward to the position illustrated in Figure 15, wherein the pivot point 138 has advanced beyond the end of the arm 140 which has been retained from further movement by the link 142. This results in the blade 34 pivoting upwardly about the pivot 138 to strike the tape against the article positioned in the machine immediately above the recess 122.

The blade 34 is maintained in position against the under side of the tape, pressing it against the article in the machine, throughout the wrapping operation during which an overlap of the tape is formed. Thus holding the tape against the article until the tape is sealed against a previously laid portion of the tape makes it possible to employ the wrapping machine to bind or bundle articles having surfaces of such character that the free end of the tape could not be adhesively attached thereto with the firmness necessary to retain the end of the tape in position on the article during a succeeding stage of the wrapping operation wherein the tape is placed under tension in order to secure a firm binding or bundling.

Accordingly, toward the conclusion of the wrapping operation the tacking blade 34 lies between the overlapped portions of the tape T and T' as illustrated in Figure 16. At the conclusion of the wrapping operation the air supply to the tacking mechanism cylinder 148 is cut off and the piston rod 146 is spring-returned to its initial position, thus retracting the plunger 136. The return movement of the plunger causes the blade 34 to be withdrawn from between the tape portions T and T—1 to the dotted line position shown in Figure 16. Upon further rearward movement of the plunger the blade 34 will be removed altogether from between the overlapped portions of the tape and is thereupon free to swing downwardly into the lowered position shown in Figures 12 and 13.

In order to form a secure bundle it is necessary to place the tape under tension as it is being drawn around the article being wrapped. Such tension is obtained by retarding the rotation of the reel on which the tape supply is wound. As it may be seen in Figures 17 and 18, the tape reel 150 is provided with a hub portion 152 having a circumferential groove which receives the loop of a brake-band 154. The ends of this band are crimped in a sleeve 156 which is fixed to a rod 158 which is normally urged in a brake applying direction by the spring 160 (Figure 1). It is also necessary, however, to release the tension on the tape at the beginning of the wrapping operation so that the free end of the tape adhesively tacked to, and held against, the article by the tacking mechanism will not be broken loose from the article due to a tension being applied to the tape while the area of contact between the tape and the article is still quite limited. The release of the tension on the tape during the first portion of the wrapping operation is accomplished by means of the solenoid 162 having its armature 164 positioned with respect to the end of the rod 158 to act upon the rod when the solenoid is energized and thus overcome the brake-applying spring 160. The solenoid 162 is connected into the control system, which is hereinafter explained in more detail, to release the tension on the tape until after the tape has been drawn around the first corner of the article being wrapped, or in the event the article is other than rectangular, until the tape is being laid on the article by the tape-guide at an angle about 90° from the plane in which it was initially attached to the article. Thereafter, the tension is again applied. The cylindrical hub portion 166 of the tape drum which engages the core of the tape supply is provided with a series of axial serrations arranged around its circumference to prevent the tape supply from slipping on the hub as the tape is drawn off under tension.

When the wrapping operation has progressed to the point where an overlap of the tape sufficient to insure a firm binding has been made, the tape is cut by the severing means, and the free end of the length of tape wrapped around the article is firmly wiped down by the spring extension 116 as the tape-guide is carried through the remainder of its second revolution to its rest position. As previously explained, the severing action is accomplished by the blade 31 which is moved upwardly through the slot 124 into cutting engagement with the tape which is then disposed in the guideway 111 beneath the plungers 32, 33.

Referring to Figure 8 it may be seen that the cutting blade 31 is rigidly secured to an arm 170. The arm 170 is provided with pins 172, 174 which are received in the slots 176, 178, respectively, provided in the plate 180. This plate is rigidly fixed to the under side of the tape-guiding arm, transversely thereof, and immediately adjacent the arm 170. The slot 176 is formed parallel to the under surface of the tape-guiding arm and the slot 178 is inclined upwardly toward the under surface so that upon movement of the arm 170 to the left as viewed in Figure 8, the pin 174 will ride up the slot 178 thus raising the blade 31 upwardly through the slot 124 into cutting engagement with the tape trapped beneath the plungers 32, 33. Leftward movement is imparted to the arm 170 through its pivotal connection to one end of the link 182 which at its other end is fixed to the armature of a solenoid 184. The arm 182 is fulcrumed intermediate its ends at 186, and is normally acted upon by the spring 188 to retain the arm 170 in the position in which it is shown in Figure 8. The solenoid 184 is connected into the control system for the machine so that at the appropriate time in the wrapping operation it will be energized to swing the arm 182 clockwise about its fulcrum to cause the blade 31 to be moved into its tape-cutting position.

The tape severing means, in conjunction with the plungers 32, 33, comprise means for seizing and retaining the free end of the tape supply in position over the recess 122 where it may be acted upon by the tacking mechanism at the beginning of the succeeding wrapping operation. Referring to Figure 9, the solid line positions of the cutting blade 31 and the tape T represent those occupied by the tape and the cutting blade immediately prior to the beginning of the cutting movement of the blade. As the blade is raised into cutting engagement with the tape, it first moves the tape to the position illustrated in chain lines in Figure 9 wherein the tape on either side of its point of engagement with the cutting blade is raised into contact with the under side of the plungers 32, 33. The plungers thus prevent the tape from further retreating before the cutting blade, and as the cutting blade continues to move upwardly the tape is severed as indicated in dotted lines in Figure 9. In the course of the severing action the newly formed free end of the tape supply is wiped onto the plunger 33 to which it adheres until subsequently detached by the action of the tacking mechanism. The severed end of the tape which is being wrapped around the article passes freely beneath the roller 125 which is journaled on the distal end of the plunger 32, and is firmly wiped into place by the spring extension 116. The surface of the roller 125 is provided with a plurality of axially spaced ridges in order to reduce the area of contact between the roller and the tape which passes beneath it.

When the tacking mechanism blade 34 is operated to strike the tape against the article to be wrapped the free end of the tape is detached from the plunger 33 and the tape is raised out of the guideway 111 to the rear of the dog 118. The tape remains in this raised position with respect to the tape-guiding arm during the first portion of the movement thereof at the beginning of the wrapping operation. Accordingly, the tape at this time passes over the plungers 32, 33 and provisions must be made to return the plungers to the position in which they overlie the tape in order that the tape will subsequently be properly positioned to be acted upon by the cutting blade 31. The plungers are returned to their tape overlying position by withdrawing the plungers from the guideway 111 at the beginning of the wrapping movement of the tape-guiding arm and thus withholding them until the tape is again disposed in the guideway 111. The plungers are then permitted to resume their normal position in which they overlie the tape, thereby readying the entire tape-severing mechanism for a subsequent operation.

The plungers 32, 33 are withdrawn, as aforesaid, by means of a lever 190 which at its one end is secured to a block 192 in which the plungers are fixed, and which at its other end is fixed to the armature 194 of the solenoid 196. The plungers are arranged for sliding movement transversely of the tape-guiding arm in suitable apertures in the bar 110 and the bar 198 which is fixed to the upper surface of the tape-guiding arm in parallelism with the bar 110. Helical springs 200 are fixed at one of their ends to the plungers intermediate the bars 110, 198 and at their other ends abut the bar 198. These springs act to urge the plungers in the position in which the free ends extend into the tape-guideway 111, as illustrated in Figure 6. When the solenoid 196 is energized toward the beginning of the wrapping operation, the lever 190 is caused to pivot about its fulcrum 202 and thus withdraw the ends of the plungers from the guideway 111 against the force of the springs 200. Subsequently in the wrapping operation the solenoid 196 is de-energized by the control mechanism therefor, and the plungers 32, 33 are then returned to the position illustrated in Figure 6 of the drawings by the action of the springs 200. At this time the tape which has previously been tacked to the article being wrapped is again disposed in the bottom of the guideway 111 and the tape is thus trapped beneath the plungers 32, 33 in which position it may be effectively acted upon by the tape-severing mechanism. It may be seen in Figure 5 that the tape will again lay in the bottom of the guideway when the arm progresses to the first dotted line position shown therein. At this point the tape is passing onto the article from the spring extension 116 and is thus held firmly on the bottom of the guideway 111. At or after the tape-guiding arm has been rotated to this position the solenoid 196 may be deenergized and the tape will be trapped beneath the plungers 32, 33 as they are returned to their normal position by the action of the springs 200.

It will appear from the foregoing description that when an article is placed in the wrapping machine and the machine is started, the clamps 22, 23 are operated to position the article, and at the same time the tacking mechanism acts to fix the free end of the tape supply to the positioned article. At the same time the bolt 38 is withdrawn from engagement with the cam plate 40 on the tape-guiding arm, thus permitting the end of the arm to swing into engagement with the article. Immediately thereafter, the tape drum brake 154 is released and the rotation of the annular member 26 is initiated. At this time the plungers 32, 33 are withdrawn from the tape guideway 111. When the tape-guiding arm 28 has been carried to the vicinity of the first dotted line position shown in Figure 5 by the rotation of the annular member, the tape again lies in the bottom of the guideway 111 and the plungers 32, 33 are permitted to return to their normal position in which they overlie the tape in the guideway. When the rotation of the annular member has carried the tape-guiding arm to the vicinity of the second dotted line position indicated in Figure 5 the tape drum brake is reapplied, thus placing the tape under tension for the remainder of the wrapping operation. At a point at which the annular member has been rotated sufficiently beyond one revolution to form the desired degree of overlap of the tape the severing mechanism is caused to operate. The annular member thereafter continues to rotate through the remainder of its second revolution to return to its rest position. Thereupon the rotation is discontinued and the clamps 22, 23 are retracted from their article-engaging position. At the same time the tacking blade 34 is withdrawn from between the overlap of the tape and the bolt 38 is returned to the position in which it engages the cam 40 on the tape-guiding arm. The machine is then in condition for the start of another wrapping operation.

The operation of the various component devices of the machine in the timed relationship described above is obtained by the control system which is depicted in Figures 19 and 20.

Referring to Figure 20, a source of electrical power is applied to the conventional magnetic switch 210 through the leads 212. A circuit which includes the holding-in coil 214 of the magnetic switch comprises a starting button 216 of the type that remains in closed position so long as current is flowing in the circuit. The switch 216 is one of the commercially available kind which instantaneously energizes the hold-in-coil of the magnetic switch. The interlock circuit of the magnetic switch keeps the hold-in-coil energized until this control circuit is broken. It has been explained previously that the rotation of the cam drum 96 in synchronized with the rotation of the annular member 26 so that the member completes two revolutions to each one made by the control drum, and that at the start of the wrapping operation the annular member must be positioned so that the recess 122 in the tape-guiding arm is in operable alignment with the tacking mechanism M. To ensure that the machine will be started only when the tacking mechanism and the recess are properly aligned, the starting button includes a circuit 218 completed through the switch 220. The switch 220 is normally open, and is closed to complete the circuit through the starting button only when the cam roller 222 fixed to the end of the switch operating arm 224 is raised by the cam 226 fixed to the surface of the cam drum 96. The cam 226 is located on the surface of the drum so that it engages the cam roller 222 only when the annular member is in the position in which the recess 122 of the tape-guiding arm is in alignment with the tacking mechanism M. As a result, the switch 220 is open and the starting button 216 is ineffective to start the machine unless the proper alignment exists between the tacking mechanism and the recess 122 of the tape-guiding arm.

When the switch 210 is closed current flow to the solenoid 230 which opens the air valve 70 placing the source of air pressure 64 in communication with the cylinders 54, 55 of the article clamping mechanism, the cylinder 43 to retract the retaining bolt 38, and cylinder 148 to operate the tacking mechanism. Thereafter, the pressure in the air line beyond the valve 70 builds up sufficiently to close the air pressure operated switch 232 which is in the circuit of the holding-in coil 234 of the main motor switch 236. The switch 236 is thereupon closed and power is applied to the motor 94 which then acts to rotate the cam drum 96 and the annular member 26. At the same time power flows up to the switches 238, 240 and 242 which control, respectively, the solenoids which actuate the tape drum brake release, the tape-retaining means, and the tape-severing mechanism. These switches, and the switch 244 which acts to break the circuit to the holding-in coil 214 and thus open the switch 210 at the completion of a wrapping operation, are each operated by cams carried on the surface of the control drum 96. The arrangement of the switch operating cams on the surface of the drum and the relative arrangement of the switches may be understood best from the planer development of the surface of the control drum illustrated in Figure 19. It will be observed that the cam 239 is arranged to engage the cam roller on the switch operating arm of the switch 238 at the beginning of the rotary movement of the control drum. This switch is normally open, and is closed only when the cam roller on its operating arm is riding on the cam 239. When the switch 238 is thus closed current is supplied to the solenoid 162 of the tape drum brake releasing mechanism through a conventional arrangement of a brush and slip ring connection between the terminals of the circuit from the switch and the annular member 26. When the drum 96 has rotated sufficiently to carry the cam 239 from beneath the cam roller on the operating arm of the switch, the switch is again opened and the solenoid 162 is de-energized thus again applying the brake to the tape drum. The length of the cam 239 is selected so that the tape drum brake releasing circuit is energized until the annular member has been rotated to the extent that sufficient tape has been applied to the article to prevent the tape from breaking loose when the tape is again tensioned.

The cam 241 is arranged to engage the roller of the actuating arm of the switch 240 also at the beginning of the rotation of the drum 96. When the cam 241 moves beneath the cam roller of the actuating arm the switch is closed to complete the circuit to the solenoid 196 which acts to withdraw the plungers 32, 33 from the guideway 111 as previously explained. The length of the lug 241 is selected to maintain the circuit to the solenoid 196 until the tape-guiding arm has been moved to a position in which the tape lies on the bottom of the guideway 111, at which time the circuit is de-energized and the plungers are spring-returned to the position in which they overlie the tape in the guideway. The switch 242, when closed, energizes the circuit including the solenoid 184 which actuates the tape-severing mechanism. It will be observed that the switch 242 is initially located more than one-half revolution of the drum 96 away from the cam 243 which acts to close the switch. Accordingly, the switch 242 is not closed to actuate the severing mechanism until the annular member 26 has made more than a complete revolution. The tape-severing operation is thus delayed until after an overlap of the tape has been formed. Preferably, the cam 243 is adjustable circumferentially on the drum 96 so that various degrees of overlap of the tape may be made before the tape is severed.

As the drum 96 approaches the completion of a full revolution, and as the annular member 26 approaches its rest position at the completion of two revolutions, the cam 245 passes beneath the roller of the actuating arm of the stop switch 244. This switch is normally closed and upon operation by the cam 245, the switch is opened to break the circuit through the holding-in coil 214 of the magnetic switch 210. The starting switch 216 then opens before the cam 245 has passed from beneath the cam roller of the actuating arm of the switch 244. The main current supply to the machine is thus interrupted and the machine is brought to a stop in condition for the start of another wrapping operation.

Having thus described the invention, what is claimed as new and desired to be secured by Letters Patent is:

1. In a wrapping machine, in combination, a support for an article to be wrapped, means for encircling said article with adhesive tape having a free end, said means including an element to which the free end of the tape may be adhesively attached, means for severing the tape and adhesively attaching the free end from supply of the tape to said element, and a device for detaching the free end from supply of the tape from said element and adhesively attaching the same to an article carried on said support, said element comprising two rod members normally positioned to overlie the tape, said severing means having a cutting edge movable towards said tape to cut the tape and to wipe the adhesive surface of the severed free end from supply onto the rod member overlying it.

2. In a wrapping machine as claimed in claim 1 in which the said element comprises means for retracting the rod members from their normal position following the operation of the said detaching device and for returning the rod members to their normal position overlying said tape prior to the operation of the said severing means.

3. In a wrapping machine, in combination, a support for an article to be wrapped, means for encircling said article with adhesive tape having a free end, said means including an element to which the free end of the tape may be adhesively attached, means for severing the tape and adhesively attaching the free end from supply of the tape to said element, and a device for detaching the free end from supply of the tape from said element and adhesively attaching the same to an article carried on said support, said element comprising two rod members, said rod members being positioned normally to overlie the tape and spaced apart from one another along the length of the tape, said severing means having a cutting edge, means for moving the cutting edge to tape cutting position intermediate said spaced apart rod members, whereby the adhesive surface of the free end from supply of the severed tape is wiped onto one of said rod members, and means for retracting the rod members from their normal position following the operation of the said device and for returning the rod members to their normal position overlying said tape prior to the operation of the said severing means.

4. In a wrapping machine, in combination, a support for an article to be wrapped, means for wrapping an adhesive tape around said article, said means including an element to which the free end of the tape may be adhesively attached, means for severing the tape and for adhesively attaching the free end of the severed tape to said element, and a device for detaching the free end of the tape from said element and adhesively attaching the same to an article carried on said support, said device comprising a retaining finger, means for moving said finger into engagement with the tape to press the tape against the article, said last named means acting to press the finger against the tape until after the formation of an overlap of the tape by the wrapping operation, and to withdraw the retaining finger from between the overlap of the tape.

5. In a wrapping machine, in combination, a support for an article to be wrapped, means for encircling said article with adhesive tape, said means comprising a pivoted arm adapted to rotate about said article and guide the adhesive tape from a supply thereof onto said article, means acting on said arm for normally pressing the portion of the arm from which the tape passes onto the article toward said article support, and means operable upon the completion of the wrapping operation for preventing movement of said portion of the arm toward said article support.

6. In a wrapping machine, in combination, a support for an article to be wrapped, means for encircling said article with adhesive tape, said means comprising a pivoted arm for guiding the adhesive tape from a supply thereof onto said article, means for normally pressing the portion of the arm from which the tape passes to said article toward said article support, means for carrying said arm around said article, and a member supported on said carrying means in a following direction from said arm, said member being resiliently urged toward said article to press onto said article the tape placed thereon by movement of said arm.

7. In a wrapping machine, in combination, a support for an article to be wrapped, means for encircling said article with adhesive tape, said means comprising a pivoted arm for guiding the adhesive tape onto said article from a supply thereof, means for normally pressing the portion of the arm from which the tape passes to said article toward said article, means for carrying said arm around said article, a member supported on said carrying means in a following direction from said arm, said member being resiliently urged toward said article to press onto said article the tape placed thereon by movement of said arm, and means operable upon the completion of the wrapping operation to move said member away from said article and to prevent movement of said portion of the arm toward said article.

8. In a wrapping machine, in combination, a support for an article to be wrapped, a clamp for holding said article in a fixed position on said support during a wrapping operation, means for moving said clamp to engage said article at the beginning of a wrapping operation and to release said article at the completion thereof, means for wrapping said article with adhesive tape, said wrapping means including a member resiliently urged toward said article to press onto the article tape placed thereon by the wrapping operation, means on said clamp to engage said member, whereby the member is moved away from the article when the clamp is moved to release the article at the completion of the wrapping operation.

9. In a wrapping machine, in combination, a support for an article to be wrapped, means for encircling the article with adhesive tape, said encircling means including an annular member encircling said support, means for rotating said annular member, an arm pivotally supported on said annular member for guiding the adhesive tape onto said article from a supply thereof, means for normally pressing the portion of the said arm from which the tape passes onto the article toward said article, a rod member supported for reciprocating movement on said arm and normally overlying the tape being guided by said arm, a cutting means supported on said arm, said cutting means being movable toward said tape to sever the tape and to wipe onto said rod member the free end of the severed tape, a device for detaching the tape from said rod member and adhesively attaching the tape to said article, said device including a retaining finger, means for moving the retaining finger into engagement with the tape to press the tape against the article, means acting thereafter to retract said rod member from its normal position above the tape being dispensed, said means for moving the retaining finger acting to maintain said finger against said tape until after an overlap of the tape has been formed by the wrapping operation, and means acting upon the completion of the wrapping operation to withdraw said retaining finger from between the overlap of the tape and to prevent movement of the said portion of the tape guiding arm toward said article.

10. In a wrapping machine as claimed in claim 9, which comprises a clamp for holding said article in a fixed position on said support during a wrapping operation, means for moving said clamp to engage said article at the beginning of a wrapping operation and to release said article at the completion thereof, said article encircling means including a tape pressing arm supported on said annular member in a following direction from said tape-guiding arm, said tape pressing arm being normally resiliently urged against the tape placed on said article by the wrapping operation, means on said clamp to engage said tape pressing arm, whereby the tape pressing arm is moved away from said article when the clamp is moved to release the article at the completion of a wrapping operation.

11. In a wrapping machine, in combination, a support for an article to be wrapped, means for encircling the article with adhesive tape, said encircling means comprising an arm for guiding the tape onto said article from a tape supply and a tape pressing arm for pressing against the article the tape which has been applied thereto by said tape-guiding arm, means for revolving the arms about said article to encircle it with tape, both said arms being resiliently urged toward said article during the wrapping operation, means for terminating the movement of said arms at a single selected position, and means positioned and arranged to engage said arms when in the said selected position at the termination of the wrapping operation and to withdraw the arms from contact with said article.

12. In a wrapping machine, in combination, a support for an article to be wrapped, means for encircling said article with adhesive tape having a free end, said means including an element to which the free end of the tape may be adhesively attached, means for severing the tape and adhesively attaching the free end from supply of the tape to said element, and a device for detaching the free end from supply of the tape from said element and adhesively attaching the same to an article carried on said support, said element comprising two rod members, said rod members being positioned normally to overlie the tape and being spaced apart from one another along the length of the tape, said severing means having a cutting edge, means for moving the cutting edge to tape cutting position intermediate said spaced apart rod members, whereby each of the free ends of the severed adhesive tape are wiped onto one of said rod members, the tape engaging surface of the rod member more remote from the tape supply consisting of a freely revoluble roller.

13. In a wrapping machine, in combination, a support for an article to be wrapped, means for encircling said article with adhesive tape having a free end, said means including an element to which the free end of the tape may be adhesively attached, means for severing the tape and adhesively attaching the free end from supply of the tape to said element, and a device for detaching the free end from supply of the tape from said element and adhesively attaching the same to an article carried on said support, said element comprising two rod members, said rod members being positioned normally to overlie the tape and being spaced apart from one another along the length of the tape, said severing means having a cutting edge, means for moving the cutting edge to tape cutting position intermediate said spaced apart rod members, whereby each of the free ends of the severed adhesive tape are wiped onto one of said rod members, the tape engaging surface of the rod member more remote from the tape supply consisting of a freely revoluble roller, and means for retracting the rod members from their normal position following the operation of the said device and for returning the rod members to their normal position overlying said tape prior to the operation of said severing means.

References Cited in the file of this patent
UNITED STATES PATENTS

| | | |
|---|---|---|
| 1,830,641 | Corbett | Nov. 3, 1931 |
| 2,057,061 | Eggers | Oct. 13, 1936 |
| 2,227,171 | Anderson | Dec. 31, 1940 |
| 2,269,621 | Davies et al. | Jan. 13, 1942 |
| 2,504,059 | Weber | Apr. 11, 1950 |
| 2,504,060 | Weber | Apr. 11, 1950 |